(12) United States Patent
Aoki et al.

(10) Patent No.: US 7,059,652 B2
(45) Date of Patent: Jun. 13, 2006

(54) AUTOMOBILE SUN VISOR STAY THAT MAINTAINS SAFETY IN EMERGENCIES

(75) Inventors: Katsushi Aoki, Aichi (JP); Hidetoshi Utusmi, Saitama (JP); Yuji Hiyoshi, Saitama (JP)

(73) Assignees: Hayashi Telempu Co., Ltd., Tokyo (JP); Honda Motor Co., Ltd., Aichi (JP)

( * ) Notice: Subject to any disclaimer, the term of this patent is extended or adjusted under 35 U.S.C. 154(b) by 64 days.

(21) Appl. No.: 10/966,559

(22) Filed: Oct. 15, 2004

(65) Prior Publication Data

US 2005/0082867 A1    Apr. 21, 2005

(30) Foreign Application Priority Data

Oct. 16, 2003    (JP)    ............................. 2003-356874

(51) Int. Cl.
*B60J 3/00*    (2006.01)

(52) U.S. Cl. ................. 296/97.9; 296/97.12; 296/97.11

(58) Field of Classification Search ............... 296/97.9, 296/187.05
See application file for complete search history.

(56) References Cited

U.S. PATENT DOCUMENTS

| | | | | |
|---|---|---|---|---|
| 3,477,678 A | * | 11/1969 | Icke et al. ................ | 296/97.13 |
| 4,489,974 A | * | 12/1984 | Warhol .................... | 296/97.12 |
| 4,500,131 A | * | 2/1985 | Fleming .................... | 296/97.12 |
| 4,521,046 A | * | 6/1985 | Foggini .................... | 296/97.12 |
| 5,143,678 A | * | 9/1992 | Prillard .................... | 296/97.5 |
| 5,338,083 A | * | 8/1994 | Gute ........................ | 296/97.9 |
| 5,486,033 A | * | 1/1996 | Lecorvaisier et al. .... | 296/97.13 |
| 5,934,734 A | * | 8/1999 | Wilson .................... | 296/97.11 |
| 6,676,129 B1 | * | 1/2004 | Wilson .................... | 296/97.9 |
| 6,799,795 B1 | * | 10/2004 | Zapinski ................ | 296/187.05 |
| 6,890,017 B1 | * | 5/2005 | Herbst et al. ............ | 296/97.11 |
| 6,962,385 B1 | * | 11/2005 | Wieczorek et al. ...... | 296/97.11 |
| 2005/0200155 A1 | * | 9/2005 | Asai ........................ | 296/97.13 |

FOREIGN PATENT DOCUMENTS

JP    2001-80354    3/2001

\* cited by examiner

*Primary Examiner*—Kiran B. Patel
(74) *Attorney, Agent, or Firm*—Knobbe Martens Olson & Bear, LLP (57) ABSTRACT

A stay of an automobile sun visor includes a vertical part that is attached to the ceiling, a horizontal part that supports a light-blocking plate, and a curved part that connects the vertical part and the horizontal part. A tube core made of metal is provided through the center of the stay, and the periphery of this tube core is covered by a covering resin. Discontinuous points, which are the boundaries between two types of resin, are provided in the covering resin at prescribed positions of the vertical part and horizontal part. A discontinuous point at which bending deformation of the tube core occurs more easily is further provided in the tube core at a position that corresponds to these discontinuous points.

19 Claims, 4 Drawing Sheets

AUTOMOBILE SUN VISOR STAY THAT MAINTAINS SAFETY IN EMERGENCIES

BACKGROUND OF THE INVENTION

1. Field of the Invention

The present invention relates to a stay for supporting the sun-blocking plate of an automobile sun visor that is used to prevent glare by positioning the light-blocking plate between the automobile window and an occupant's head.

2. Description of the Related Art

Figure 1A:
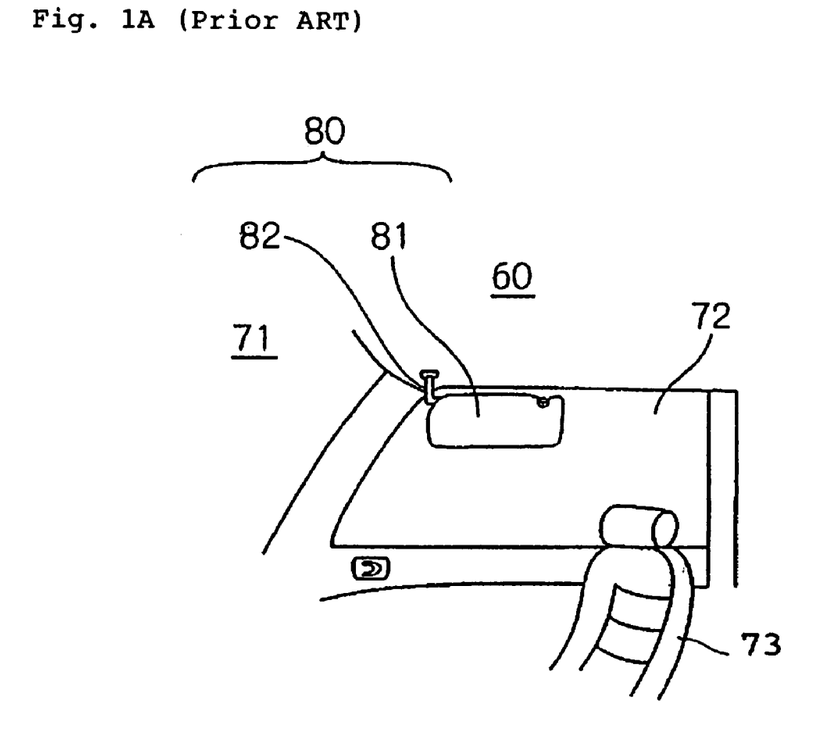
FIG. 1A is a schematic view showing the interior of an automobile in which an automobile sun visor of an example of the prior art is attached, and shows the state in which the light-blocking portion of the automobile sun visor is arranged at a position of use that is close to the side window.

The occupant of an automobile conventionally employs an automobile sun visor having a light-blocking plate that can be positioned between an automobile window and the occupant's head to block, for example, sunlight, prevent glare, and thus ensure a good visibility. As shown in FIG. 1A, in automobile sun visor 80 of a typical configuration, flat light-blocking plate 81 that is opaque or translucent and that has a prescribed size is supported in the interior of the automobile by a support axis, i.e., stay 82, that is linked to one edge of light-blocking plate 81 and that is attached to a portion of automobile ceiling 60 between windshield 71 and side window 72.

As stay 82 of this type of automobile sun visor 80 in a passenger automobile, a construction having L-shaped configuration that is bent in a 90° angle at a middle part such as shown in FIG. 1A is typically used that includes: a vertical part that extends downward from ceiling 60, a horizontal part that extends horizontally, and a curved part that links the vertical part and horizontal part, a stay of this configuration being disclosed in, for example, Japanese Patent Laid-Open Publication No. 2001-80354. In this type of stay 82, the vertical part is attached so as to allow rotation around a vertical axial line, and the horizontal part is linked to light-blocking plate 81 such that light-blocking plate 81 can be rotated. The combination of the rotation of this vertical part around the vertical axial line and the rotation of light-blocking plate 81 around the horizontal part allows the occupant to position light-blocking plate 81 in various desired positions according to the conditions of travel.

The arrangement of light-blocking plate 81 of this type of automobile sun visor can be classified among three types.

The first arrangement is an arrangement for positioning light-blocking plate 81 in a position of non-use along ceiling 60. By adopting this arrangement, the occupant can make automobile sun visor 80 unobtrusive.

The second arrangement is an arrangement for rotating light-blocking plate 81 downward around the horizontal part from the position of non-use and thus positioning light-blocking plate 81 between the occupant's head and windshield 71. By adopting for this arrangement, the occupant can block the irradiation of light from ahead of the automobile.

The third arrangement is an arrangement for rotating the vertical axis from the position of the second arrangement and positioning light-blocking plate 81 between the occupant's head and side window 72. By adopting for this arrangement, the occupant can block the irradiation of light from the side of the automobile.

In recent years, air bags that can effectively protect an occupant's head etc. are frequently provided in automobiles as equipment for protecting occupants. When it is determined, based on the occurrence of a strong impact to an automobile and so on, that a collision has occurred or that there is a high possibility of a collision, an air bag expands rapidly to deploy, for example, between the occupant and the interior walls, thereby easing the shock caused when an occupant collides with the interior walls etc. and thus serving the function of protecting the occupant. Well-known examples of such air bags are mounted as modules in the steering column, instrument panel, or door trim, and the latest forms include examples in which air bag modules are mounted in the ceiling of an automobile.

Figure 1B:
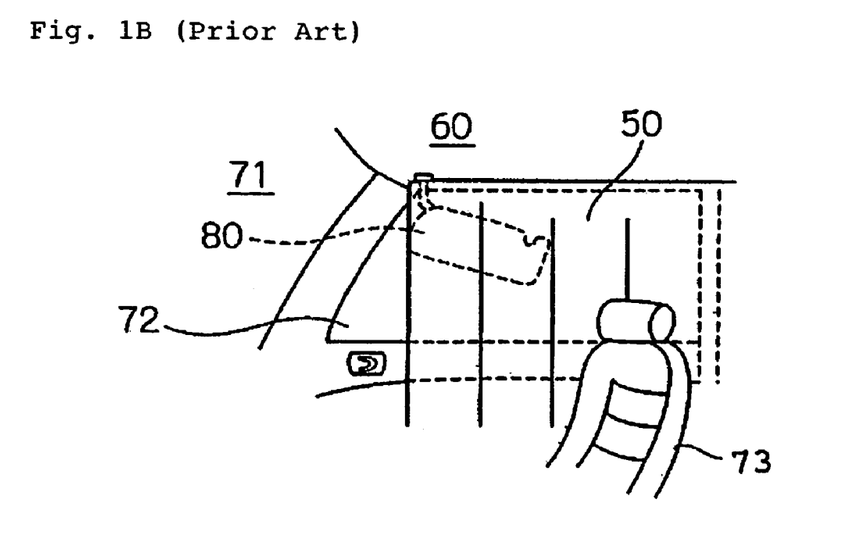
FIG. 1B shows the state in which, from the state shown in FIG. 1A, an air bag that is attached to the ceiling of the automobile has deployed.

As an example of an air bag that is mounted in the ceiling, air bag 50 is known that is configured to deploy downward in the manner of a curtain from the portion of ceiling 60 above side window 72 and along side window 72, as shown in FIG. 1B. When this type of air bag 50 deploys with automobile sun visor 80 arranged in the third arrangement in which light-blocking plate 81 is positioned between the occupant's head and side window 72, air bag 50 may interfere with automobile sun visor 80 while in the process of deployment. When interfering with automobile sun visor 80 while deploying at high speed, air bag 50 exerts a strong shock load for a short interval against automobile sun visor 80, and this force may exceed 1000 N. Thus, as shown in FIG. 1B, it is possible that stay 82 of automobile sun visor 80 will be bent.

Stay 82 is normally covered by a resin for the purpose of improving the external appearance. When stay 82 is deformed in this type of automobile sun visor 80 of the prior art, cracks or fractures may in some cases occur in this cover resin, and there is the danger that sharp parts will be formed and that splinters will be scattered, whereby the safety of occupants is compromised.

SUMMARY OF THE INVENTION

The present invention was realized in view of the problems of the above-described prior art and has as an object the provision of a stay of a sun visor for use in an automobile that does not compromise the protection of occupants even when an air bag that deploys in curtain form between an occupant's head and a side window interferes with an automobile sun visor while in the process of deployment.

To achieve this object, the inventors of the present invention have reached several conclusions as a result of diligent research regarding the events when the above-described air bag that deploys in curtain form from the portion of the ceiling above the side window between the occupant's head and the side window interferes with a sun visor while in the process of deployment.

First, as a method of preventing problems when a sun visor (light-blocking plate) interferes with an air bag, a configuration may be considered in which the stay is not deformed. However, making the stay strong enough to withstand the force of deployment of the air bag is not preferable because such a configuration necessitates a stay that is particularly thick, increasing the weight and detracting from the appearance of the stay. A configuration must be adopted that can maintain safety even if the stay should be deformed. Thus, the stay is preferably realized such that, when an excessive force is applied to the stay, the stay is to some extent deformed in a manner that is designed in advance so as not to cause danger, and thus absorbs the energy of the load that is applied from the air bag and mitigates the effect of any unpredicted deformation.

In addition, the deformation of an L-shaped stay that occurs when excessive force is applied by an air bag normally focuses on the curved part between the vertical part and the horizontal part of the L-shaped stay. More specifically, the deformation tends to occur in a manner that increases the angle between the vertical part and the horizontal part. When large local deformation of this type occurs, the form of deformation tends to vary depending on the conditions in which deformation occurs, i.e., depending on, for example, even the slightest variations in the arrangement of the sun visor, and it is therefore difficult to realize a configuration that always reliably brings about the above-described predicted deformation in the area of the curved part. Thus, when an excessive force is applied, the deformation that is generated for absorbing this energy preferably occurs in the linear portions, i.e., the vertical part and the horizontal part, of the stay.

The stay of an automobile sun visor of the present invention that resulted from the above-described study is an L-shaped configuration that includes: a vertical part that is attached to the automobile ceiling and that extends downward from the ceiling; a horizontal part that extends horizontally, that is linked to a light-blocking plate of the automobile sun visor, and that supports the light-blocking plate; and a curved part that connects the vertical part and the horizontal part.

This stay includes: a tube core made of metal that extends through the center of the vertical part, curved part, and horizontal part; and a covering resin that covers the periphery of the tube core. Points at which separation occurs more easily than at other portions are formed in this covering resin at prescribed positions of the vertical part and/or the horizontal part.

According to this configuration, when an excessive load is applied to an automobile sun visor by a deploying air bag, the covering resin separates at prescribed points that have been formed such that separation occurs more easily than at other portions. In the portions of the stay in which separation has occurred in the covering resin, the flexural strength is reduced in comparison to other portions, and subsequent deformation of the stay is therefore concentrated in portions in which separation has occurred in the covering resin, whereby the energy of the load can be absorbed and deformation in other portions can be mitigated.

As the configuration for forming the points at which separation occurs more easily than at other portions in the covering resin according to the above description, a configuration may be employed in which a first covering resin and a second covering resin having different physical properties are formed connected to each other across an interposed boundary surface, this boundary surface being the point at which separation occurs more easily than at other portions.

The boundary surface of a point at which separation occurs more easily in the covering resin is preferably an inclined surface having a prescribed angle of inclination with respect to the axial direction of the vertical part or the horizontal part, whereby separation occurs comparatively easily when force is applied.

Alternatively, at least one of the points at which separation occurs easily in the covering resin may be formed as a boundary surface that is a form in which the resin regions that sandwich the boundary surface are engaged. A point at which separation occurs easily that has this type of boundary surface is more difficult to separate than the above-described point at which separation occurs easily in which the above-described boundary surface is an inclined surface. Providing a point at which separation occurs easily that has this type of boundary surface together with a point at which separation occurs easily in which the boundary surface is an inclined surface enables control over the priority of the points at which separation occurs.

In either case, the configuration of points at which separation occurs more easily than other portions of the covering resin is preferably adjusted such that, when an excessive load is applied to the automobile sun visor, separation occurs at these points with priority to deformation at other points of the covering resin.

Further, in the stay of the present invention, a part having a sectional profile that is discontinuous such that bending deformation will occur more easily is preferably provided in the tube core at a position that corresponds to at least one point at which separation occurs more easily than at other points in the covering resin. The provision of a part in the tube core in which bending deformation occurs more easily allows separation to occur with priority at the point in the covering resin at which separation occurs more easily than at other portions that corresponds to this part, and further, encourages the concentration of deformation in this part following the occurrence of separation, and thus enables more effective suppression of deformation in other portions.

In addition, a configuration is preferable in which the tube core at the curved part is deformed into a flat shape that is parallel to the plane that includes the axial lines of the vertical part and horizontal part. Adopting this configuration can more effectively suppress the occurrence of deformation at the curved part in the stay in which unpredictable deformation normally tends to concentrate, i.e., deformation in which the angle between the vertical part and horizontal part increases.

According to the present invention as described hereinabove, when excessive force is exerted upon an automobile sun visor from a deploying air bag, the occurrence of separation in the covering resin can be caused to occur in the initial stage of the deformation of the stay at points of the covering resin at which separation occurs more easily than at other portions that are provided in the vertical part and/or the horizontal part of the stay. Due to the separation of the covering resin, the flexural strength of the stay in these portions becomes weaker than at other positions, with the result that bending deformation occurs with priority with these portions as the starting points. The load energy can consequently be absorbed, and deformation at other portions, and in particular, deformation that causes the angle of the curved part to increase, can be mitigated. This suppression of the deformation at unpredictable points can suppress cracking in the covering resin and the occurrence of sharp parts, can suppress the scattering of a portion of the covering resin, and can thus suppress the occurrence of problems relating to the protection of occupants.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 2:
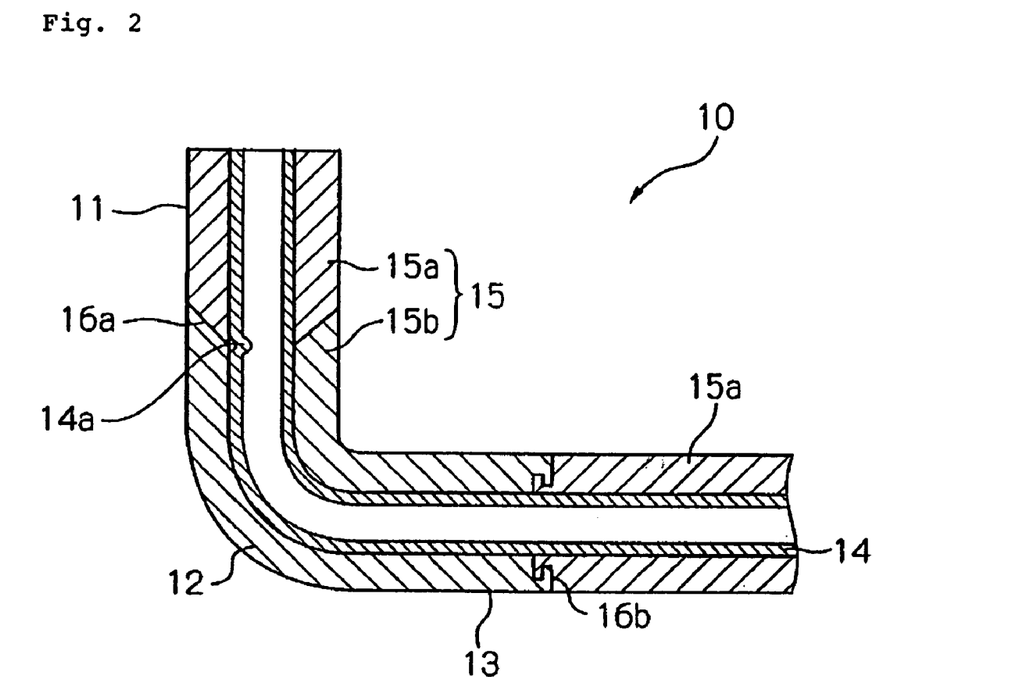
FIG. 2 is a schematic sectional view showing the stay of an embodiment of the present invention that supports the light-blocking part in an automobile sun visor.

As shown in FIG. 2, stay 10 of the present embodiment has an L-shaped configuration that includes: vertical part 11 that extends in a vertical direction; horizontal part 13 that extends horizontally; and curved part 12 that is bent in a 90° angle and that connects vertical part 11 and horizontal part 13.

Figure 4:
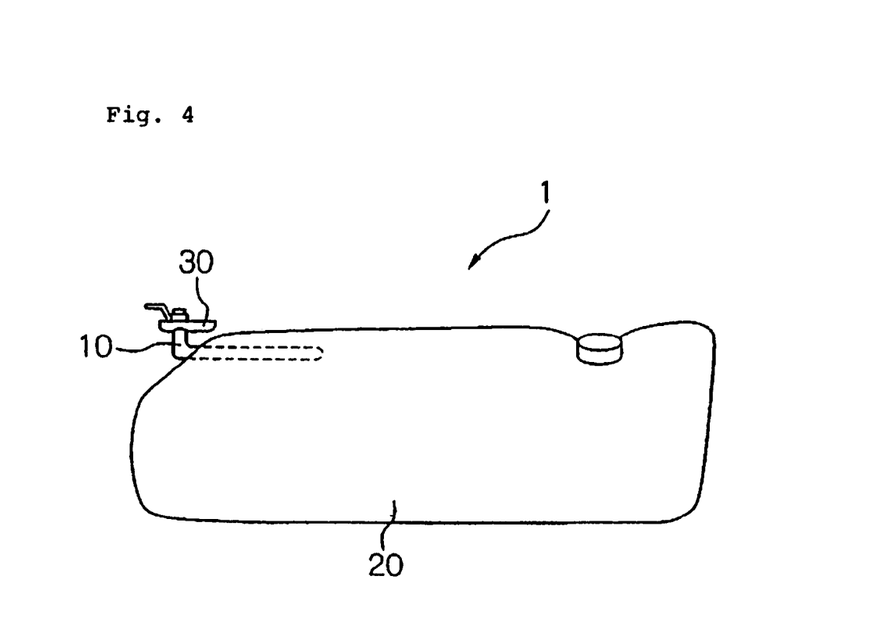
FIG. 4 is a schematic view of an automobile sun visor that is provided with the stay of FIG. 2.

As shown in FIG. 4, vertical part 11 of stay 10 is linked to and rotatably supported by bracket 30 that is made of resin and that is attached to the ceiling of the automobile. On the other hand, opaque light-blocking plate 20 is linked by one of its edges to, and is rotatably supported by, horizontal part 13 of stay 10. Thus, depending on the situation of travel of an occupant, light-blocking plate 20 can be positioned to a position of non-use along the ceiling of the automobile or to a desired position of use between the occupant's head and the windshield or between the occupant's head and a side window.

Stay 10 is made up by tube core 14 that is made of metal and that extends centrally over its entirety, and covering resin 15 that covers the periphery of this tube core 14.

Figure 5:
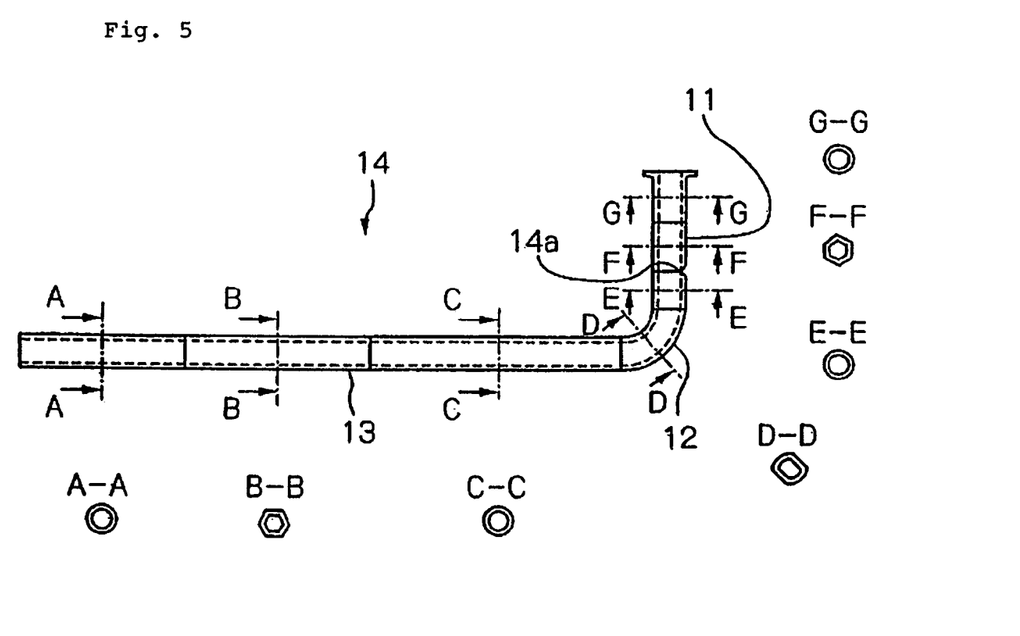
FIG. 5 is a schematic outer view and a sectional view of each portion of the tube core of the stay of FIG. 2.

Tube core 14 is ideally formed using a hollow tube that is made of metal and that has a circular sectional profile. The outer diameter of tube core 14 is approximately 5.0–10.0 mm, the inner diameter is approximately 4.0–9.3 mm, and the wall thickness is approximately 0.5–2.0 mm. Through the application of a bending process, this hollow tube is plastically deformed into an L-shape to form L-shaped tube core 14. Tube core 14 maintains a hollow portion that is continuous over its entire length, and the wiring of electrical components that are attached to light-blocking plate 20 can pass through this hollow portion. On the whole, tube core 14 has a generally circular cross-section, but as shown in FIG. 5, tube core 14 is deformed by the formation of partially planar portions in its periphery at the centers of horizontal part 13 and vertical part 11. This provision can prevent the shifting of covering resin 15 in the circumferential direction of tube core 14.

In addition, curved part 12 is deformed to a flat shape that is parallel to the plane that contains the axial lines of vertical part 11 and horizontal part 13. Curved part 12 is therefore more difficult to deform in the direction that changes its angle. The reduction in the thickness of the flattened portion of curved part 12 is preferably 10–20% of the width of the major axis part, whereby the resistance to a load in the direction that increases the angle can be raised by 30–50%.

In addition, discontinuous point 14a that forms a linear inward indentation is formed in vertical part 11 of tube core 14 at a prescribed position of the surface that is opposite the side to which horizontal part 13 extends. Thus, a bending deformation in the direction that is opposite the direction of extension of horizontal part 13 occurs more easily at this part than in other portions of vertical part 11.

Covering resin 15 can be formed by arranging tube core 14 in an injection molding die (in the cavity) and then injecting resin onto the periphery. A thermoplastic resin having high strength is preferably used as covering resin 15. Polyamide resin or thermoplastic elastomer resin is suitable as this type of resin, and, particularly when a high level of strength or resistance to abrasion is required, these thermoplastic resins can be combined with a reinforcing material such as glass fibers. The thickness of covering resin 15 is 1.0–2.0 mm. As will be explained hereinbelow, in the present embodiment, discontinuous points 16a and 16b that are constituted by the boundary surfaces of two types of resin are provided in this covering resin 15 at prescribed positions of each of vertical part 11 and horizontal part 13.

In the example that is shown in FIG. 2, discontinuous point 16a that is provided in vertical part 11 has a configuration having a boundary surface with an inclined surface that is inwardly inclined with downward progression, and discontinuous point 16b that is provided in horizontal part 13 has an engaged boundary surface in which the two parts on the two sides of the boundary surface are engaged.

As will be explained hereinbelow, these discontinuous points 16a and 16b have the function of facilitating the occurrence of separation along the boundary surfaces of covering resin 15 when a great load is exerted upon stay 10. A method in which the two sides that sandwich each boundary surface are formed from resins of differing physical properties is suitable as the method for forming these discontinuous points 16a and 16b. This formation can be realized by the known two-color injection molding in which different resins are injected into the same cavity from different gates. Here, the difference in these physical properties, and in particular, the difference in the flexural modulus, of the two resins that sandwich the boundaries of discontinuous points 16a and 16b is preferably at least 50%.

More specifically, discontinuous points 16a and 16b can be formed by using 66 nylon resin, which is one type of polyamide resin, as covering resin 15b in portions that are close to curved part 12 of stay 10; and by using glass fiber-reinforced 66 nylon resin, in which glass fibers have been combined with resin, as covering resin 15a in the portions of vertical part 11 and horizontal part 13 that are close to the ends of stay 10. In order to produce a difference of at least 50% in flexural modulus for covering resins 15a and 15b as described hereinabove, the proportion of combined glass fibers in covering resin 15a is preferably made 30% by weight ratio.

Other examples that may be used include the combination of an olefin resin and an olefin resin that has been reinforced by glass fibers, or the combination of a polyester resin and a polyester resin that has been reinforced by glass fibers. In either case, the two resins may be adjusted in color or coated with paint such that the color tone of the combined resins is the same, whereby discontinuous points 16a and 16b will not stand out in outward appearance and the appearance can be satisfactorily maintained.

Explanation next regards the operation when an air bag that is attached to the automobile ceiling deploys while automobile sun visor 1 that has this type of stay 10 is arranged such that light-blocking plate 20 is positioned between an occupant's head and a side window, whereby a great load is applied to automobile sun visor 1 by the air bag.

The load that is applied by the air bag generates stress against stay 10 that displaces horizontal part 13 downward, whereupon stress is focused on the portions of discontinuous points 16a and 16b of covering resin 15 because these portions constitute the boundaries of different physical properties, and separation between covering resin 15a and 15b along the boundary surfaces of these portions occurs with priority to deformation of other portions.

In the example that is shown in FIG. 2, the boundary surface of discontinuous point 16a in vertical part 11 is an inclined surface as described hereinabove. Based on investigation by the current inventors, it was found that, compared with a case in which the boundary surface is made a perpendicular surface at vertical part 11, making the boundary surface of discontinuous point 16a an inclined surface in this way facilitates the occurrence of the separation of covering resins 15a and 15b when stress is applied that causes bending deformation of vertical part 11. On the other hand, the boundary surfaces at discontinuous point 16b in horizontal part 13 are in an engaged form as previously described, and separation is therefore less likely to occur than in discontinuous point 16a in vertical part 11.

In other words, the provision of different configurations for discontinuous points 16a and 16b in the present embodiment controls the order of priority of the occurrence of separation of covering resins 15a and 15b, and in the example shown in FIG. 2, separation occurs with priority at discontinuous point 16a over discontinuous point 16b. Here, varying the angle of inclination of the boundary surface at discontinuous point 16a allows variation of the ease of occurrence of separation. This angle of inclination is preferably adjusted appropriately such that separation does not occur in normal circumstances and such that separation occurs with priority over deformation in other parts of covering resin 15 when an excessive load is applied.

In addition, the previously described discontinuous point 14a for facilitating the occurrence of bending deformation of tube core 14 is arranged in conjunction with the position of formation of discontinuous point 16a in covering resin 15 to thus promote deformation at the position of discontinuous point 16a, and accordingly, the separation between covering resins 15a and 15b that accompanies this deformation.

The occurrence of separation between covering resins 15a and 15b at discontinuous point 16a weakens this portion in comparison with other portions, and as a result, subsequent deformation of stay 10 will therefore proceed with priority given to the bending deformation at the portion in which this discontinuous point 16a is formed. In addition, discontinuous point 14a of tube core 14 also serves to give priority to the process of this bending deformation.

Figure 3:
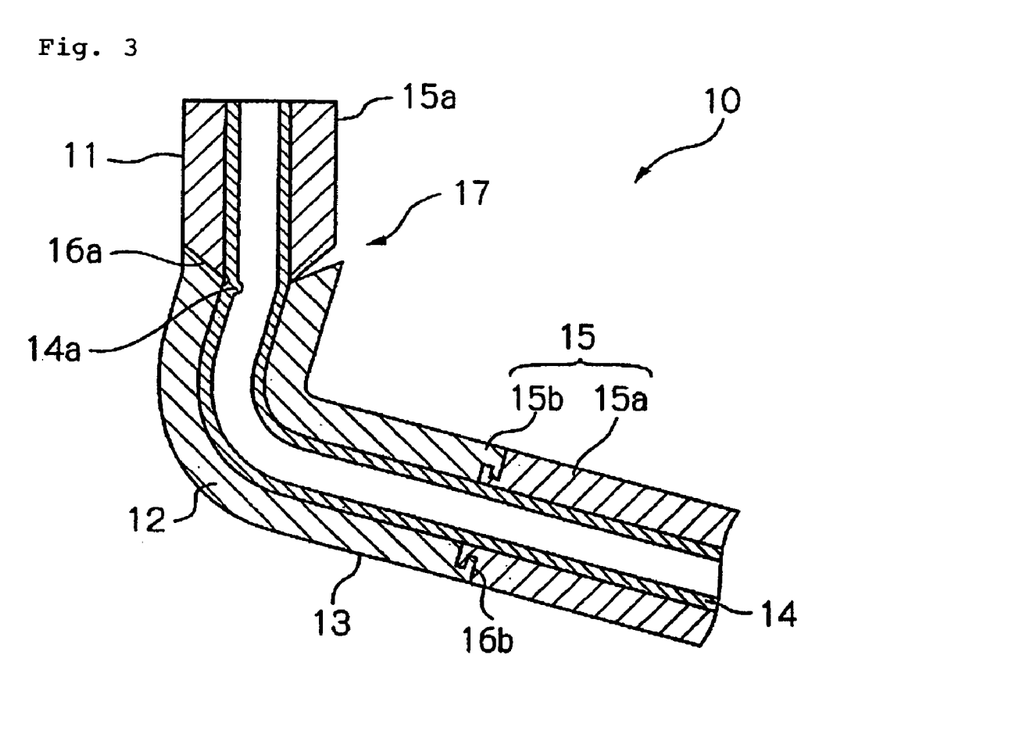
FIG. 3 is a sectional view showing the state of deformation when an excessive load is applied to the stay of FIG. 2.

Thus, when the deployment of an air bag results in the excessive application of load against automobile sun visor 1 in the configuration of the present embodiment, bending point 17 is produced at a prescribed position that corresponds to discontinuous point 16a of vertical part 11 as shown in FIG. 3, stay 10 bends with priority at this bending point 17, and deformation tends not to occur at other portions. In particular, curved part 12, in which deformation tended to focus and occur in the prior art, here assumes a flattened form as previously described that inhibits deformation that increases the angle, and this type of deformation therefore scarcely occurs.

As described hereinabove, according to the configuration of the present embodiment, when the deployment of an air bag causes an excessive load to be applied to automobile sun visor 1, stay 10 bends with priority at prescribed positions of vertical part 11 or horizontal part 13, and by this deformation, absorbs most of the energy of this load. As a result, deformation in other portions can be prevented, and in particular, deformation that increases the angle of curved part 12 can be effectively suppressed. The present embodiment can therefore prevent deformation of stay 10 at unpredicted positions, and in particular, can prevent deformation in curved part 12 in which deformation otherwise occurred relatively easily. The present embodiment thus can prevent the large local deformation that tended to occur in curved part 12 and thus prevent the occurrence of cracking in covering resin 15, the production of sharp parts, and the scattering of a portion of covering resin 15 that raised concerns regarding the safety of occupants. The separation of covering resins 15a and 15b here occurs along the boundary surface of the two resins, i.e., occurs according to a predicted form, and therefore does not raise problems regarding the safety of occupants such as the scattering of covering resin 15.

Although a case was described in the present embodiment in which separation occurs in covering resin 15 at discontinuous points 16a and 16b, which are the boundary surfaces between two types of resin, the present invention is generally not limited to discontinuous points of this configuration, and the effect of suppressing deformation at unexpected points in the present embodiment can be obtained as long as points are provided at which separation occurs more easily than at other portions.

Such points at which separation occurs more easily than at other portions may be points that, for example, due to variation of the method of forming parts that are composed from resin of identical composition on the two sides that sandwich a boundary surface, are constituted such that a physical property such as strength is different on the two sides of a boundary surface, or, in the case of two-color molding, are constituted by taking advantage of the phenomenon that the bonded surface between resins of two colors separates more easily than at other portions and by intentionally providing such points. In addition, the above-described embodiment is only an example of the present invention, and the invention is open to various modifications within the scope of the invention as described in the claims.

For example, the discontinuous points in covering resin 15 may be provided in only one of vertical part 11 and horizontal part 13. Alternatively, when discontinuous points are provided in both vertical part 11 and horizontal part 13, a discontinuous point that causes separation with priority in one of the two parts may be provided on the side of horizontal part 13.

In the present embodiment, however, bending points in stay 10, i.e., positions at which points that are discontinuous in terms of physical properties are provided in covering resin 15, are preferably provided in the linear portions of vertical part 11 and/or horizontal part 13 and not in curved part 12. Essentially, stress inherently tends to focus in curved part 12, and in the deformation that is caused by such focused stress, slight differences in the position of automobile sun visor 1 or differences in the manner of deployment of the air bag when the air bag strikes against automobile sun visor 1 are likely to produce different forms of deformation. Causing deformation to occur reliably and as predicted in this curved part 12 is therefore problematic despite the provision of discontinuous points in covering resin 15. Thus, providing discontinuous points in covering resin 15 in the linear portions of vertical part 11 and/or horizontal part 13 enables the above-described reliable and predictable occurrence of deformation.

In addition, discontinuous point 14a in tube core 14 may be provided in horizontal part 13, or may assume another configuration that can facilitate the occurrence of the above-described prescribed deformation for absorbing excessive load that may be applied when an air bag is deployed.

However, as described in the present embodiment, discontinuous point 14a of tube core 14 is most preferably formed as an indented deformation in the surface of tube core 14 that is opposite the direction of extension of horizontal part 13 and at a position that is on the inner side of the portion that is to bend as a result of the predicted bending deformation for absorbing the excessive load. Thus, if discontinuous point 14a is formed as a groove that encircles the entire circumference of tube core 14, this portion will be more vulnerable to various forms of deformation. In contrast, the present embodiment can facilitate the occurrence of only deformation for absorbing excessive load while suppressing any reduction in strength.

Explanation next regards an experimental example that was investigated regarding the deformation that occurred when an impact load was applied from above against an automobile sun visor having a stay that was fabricated on an experimental basis in accordance with the above-described embodiment, and a comparative example.

EXPERIMENTAL EXAMPLE

In the automobile sun visor of the experimental example, a tube made of steel and having an inner diameter of 4.0 mm and an outer diameter of 6.0 was used as tube core 14. As covering resin 15 around the periphery of curved part 12, 66 nylon resin (manufactured by Toray co.) was used, while a compound composed of the same 66 nylon mixed with glass resin at a proportion of 45% by weight was used as covering resin 15a in the extremities of vertical part 11 and horizontal part 13. Both covering resins were two-color molded to a covering thickness of 1.2 mm. The angle of inclination of discontinuous point 16a was approximately 45° with respect to the axial direction of vertical part 11.

An automobile sun visor having this stay was installed in a vehicle, an impact load of at least 1000 N was applied, and the deformation of the stay was observed, whereby it was confirmed that in the initial stage of the deformation of the stay, separation occurred in covering resin 15 at the location of discontinuous point 16a having an inclined boundary surface, and that bending deformation occurred in tube core 14 with this separation point as the starting point. Apart from the deformation at this point that had been predicted, little deformation was observed in other parts, and in particular, the angle of curved part 12 did not increase appreciably, and cracking and fracturing did not occur in unexpected locations in covering resin 15.

COMPARATIVE EXAMPLE

Figure 6:
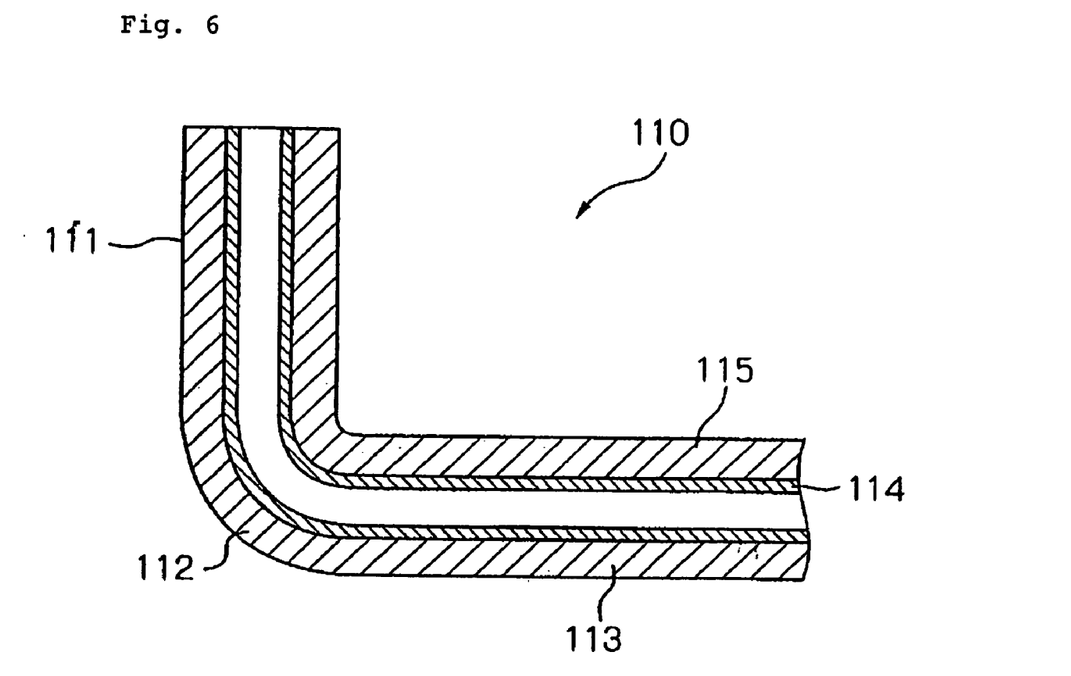
FIG. 6 is a schematic sectional view showing the stay of an example prepared for comparison with the stay of FIG. 2.

FIG. 6 shows a sectional view of stay 110 of a comparative example. In this stay 110, a tube made of steel and having an inner diameter of 4.0 mm and an outer diameter of 6.0 mm was used as tube core 114. As covering resin 115, glass fiber was mixed with 66 nylon at a weight percentage of 45% as in the experimental example, and this resin was used for covering (covering thickness of 1.2 mm) from vertical part 111 to curved part 112 and as far as horizontal part 113 as a single unit by injection molding.

Figure 7:
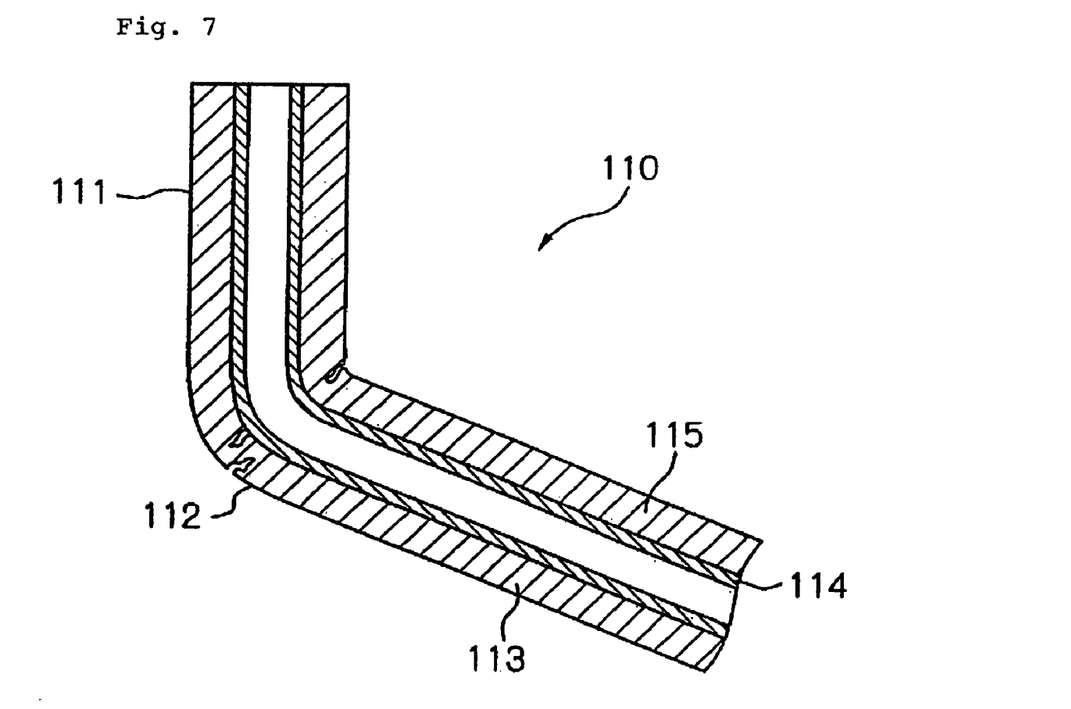
FIG. 7 is a sectional view showing the state of deformation when excessive load is applied to the stay of FIG. 6.

An automobile sun visor having this stay 110 was installed in a vehicle, an impact load of at least 1000 N was applied from above, and the deformation of stay 110 observed. As shown in FIG. 7, the results showed that the starting point of deformation of stay 110 was caused in curved part 112 and subsequent deformation proceeded in a manner that increased the angle of curved part 112. The concentration of deformation in curved part 112 resulted in cases of cracking in covering resin 115 located in curved part 112.

While preferred embodiments of the present invention have been described using specific terms, such description is for illustrative purposes only, and it is to be understood that changes and variations may be made without departing from the spirit or scope of the following claims.

What is claimed is:

1. A stay of an automobile sun visor, this stay being an L-shaped stay having:
   a vertical part that is attached to an automobile ceiling and that extends downward from the ceiling;
   a horizontal part that extends horizontally, that is linked to a light-blocking plate of the automobile sun visor, and that supports the light-blocking plate; and
   a curved part that connects said vertical part and said horizontal part;
   said stay comprising:
   a tube core that is made of metal and that extends through a center of said vertical part, said curved part, and said horizontal part; and
   a covering resin that covers a periphery of said tube core;
   wherein points at which separation occurs more easily than in other parts are formed in said covering resin at prescribed positions in said vertical part and/or said horizontal part.

2. The stay of an automobile sun visor according to claim 1, wherein at least one of said points at which separation occurs more easily than at other parts of said covering resin is a boundary between a first covering resin and a second covering resin having different physical properties.

3. The stay of an automobile sun visor according to claim 1, wherein at least one of said points at which separation occurs more easily than at other parts of said covering resin is formed at an inclined surface having a prescribed angle of inclination with respect to an axial direction of said vertical part or said horizontal part.

4. The stay of an automobile sun visor according to claim 1, wherein at least one of said points at which separation occurs more easily than at other parts of said covering resin is formed in a boundary surface that is in a form in which resin regions on two sides of the boundary surface are engaged.

5. The stay of an automobile sun visor according to claim 1, wherein said points at which separation occurs more easily that at other parts of said covering resin separate with priority to deformation at other parts of said covering resin when an excessive load is applied to said automobile sun visor.

6. The stay of an automobile sun visor according to claim 1, wherein a sectional profile of said tube core is discontinuous such that bending deformation occurs more easily at a position that corresponds to at least one of said points at which separation occurs more easily than at other points of said covering resin.

7. The stay of an automobile sun visor according to claim 1, wherein, at a location of said curved part, said tube core is deformed to a planar shape that is parallel to a plane that includes axial lines of said vertical part and said horizontal part.

8. An L-shaped stay for an automobile sun visor, comprising:
   a core tube constituted of a vertical part, a curved part, and a horizontal part; and
   a covering resin that covers a periphery of the core tube, said covering resin having at least one point of separation along the vertical part and/or the horizontal part where its physical properties are discontinued and where the covering resin is separable.

9. The stay according to claim 8, wherein the covering resin includes two pieces and the point of separation is constituted by a boundary between the two pieces.

10. The stay according to claim 9, wherein the two pieces are made of different resins.

11. The stay according to claim 10, wherein the different resins have different flexural modulus, the difference being at least 50%.

12. The stay according to claim 10, wherein one of the different resins is a glass fiber-reinforced resin.

13. The stay according to claim 9, wherein the two pieces have different cross sections.

14. The stay according to claim 9, wherein the boundary is constituted by an inclined surface with respect to an axis of the core tube where.

15. The stay according to claim 8, wherein the tube core has a sectional profile which is discontinuous to bend more easily at the point of separation than at other points of the covering resin.

16. The stay according to claim 8, wherein the point of separation is formed along both the vertical part and the horizontal part.

17. The stay according to claim 15, wherein each of the vertical part and the horizontal part has multiple points of separation.

18. The stay according to claim 8, wherein the core tube has a flattened cross section at the curved part.

19. The stay according to claim 8, wherein a light-blocking plate coupled to the stay.

* * * * *